United States Patent
Asher et al.

(10) Patent No.: US 7,660,959 B2
(45) Date of Patent: Feb. 9, 2010

(54) MANAGING ENCRYPTION FOR VOLUMES IN STORAGE POOLS

(75) Inventors: Kai Alan Gahn Asher, Tucson, AZ (US); David Maxwell Cannon, Tucson, AZ (US); Erick Christian Kissel, Tucson, AZ (US); Toby Lyn Marek, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/536,512

(22) Filed: Sep. 28, 2006

(65) Prior Publication Data

US 2008/0082835 A1    Apr. 3, 2008

(51) Int. Cl.
*G06F 12/00* (2006.01)
(52) U.S. Cl. ...................................................... 711/164
(58) Field of Classification Search ........................ None
See application file for complete search history.

(56) References Cited

U.S. PATENT DOCUMENTS 6,330,562 B1 * 12/2001 Boden et al. .................. 707/10
2002/0019935 A1    2/2002 Andrew et al.
2004/0120525 A1    6/2004 Miskimmin et al.
2006/0179327 A1 *  8/2006 Musa et al. ................... 713/193
2006/0280309 A1 * 12/2006 Krishnaswamy et al. .... 380/285
2007/0136606 A1 *  6/2007 Mizuno ....................... 713/189
2007/0180239 A1 *  8/2007 Fujibayashi et al. ......... 713/165
2007/0220277 A1 *  9/2007 Osaki .......................... 713/193
2009/0198997 A1 *  8/2009 Yeap et al. ................... 713/155

FOREIGN PATENT DOCUMENTS

WO    2005057842 A1    6/2005

* cited by examiner

*Primary Examiner*—Brian R Peugh
(74) *Attorney, Agent, or Firm*—David W. Victor; Konrad Raynes and Victor LLP

(57) ABSTRACT

Provided are a method, system, and article of manufacture for managing encryption for volumes in storage pools. At least one storage pool is defined in a database, wherein storage pools are defined to include a plurality of data volumes, wherein each volume is included in at least one storage media. An encryption status is indicated for storage pools indicating whether encryption is enabled for the storage pool. An encryption key is provided for volumes included in storage pools for which encryption is indicated as enabled. The encryption keys for volumes included in the storage pools for which encryption is enabled are stored. The database associates the encryption keys with the volumes and the volumes with the storage pools.

36 Claims, 6 Drawing Sheets

MANAGING ENCRYPTION FOR VOLUMES IN STORAGE POOLS

BACKGROUND OF THE INVENTION

1. Field of the Invention

The present invention relates to a method, system, and article of manufacture for managing encryption for volumes in storage pools.

2. Description of the Related Art

A storage manager server manages the backup and archival of data on various client systems and provides a repository for information on the archived data. A storage management server may store data objects on volumes which are grouped in storage pools, and use a database to track information about the stored data and their storage pools. After data objects have been stored, the storage management server may copy or move the data objects within volumes in the same storage pool or to volumes in other storage pools. Data volumes and the server's database may be exported to removable media and taken offsite to ensure multiple distributed copies of the data and the database for disaster recovery.

The data volumes associated with storage pools may be encrypted in a storage media to protect the data from unauthorized access. Data encryption is especially useful for business that store personal data on their customers. Recent government regulations place requirements and legal obligations about companies storing personal data to report any loss of storage media containing personal information which was not encrypted. Typically, the client application determine which data volumes to encrypt and manage the encryption keys used to encrypt and decrypt the data volumes. In certain implementations, encryption operations may be offloaded to another device.

SUMMARY

Provided are a method system, and article of manufacture for managing encryption for volumes in storage pools. At least one storage pool is defined in a database, wherein storage pools are defined to include a plurality of data volumes, wherein each volume is included in at least one storage media. An encryption status is indicated for storage pools indicating whether encryption is enabled for the storage pool. An encryption key is provided for volumes included in storage pools for which encryption is indicated as enabled. The encryption keys for volumes included in the storage pools for which encryption is enabled are stored. The database associates the encryption keys with the volumes and the volumes with the storage pools.

In a further embodiment, the encryption keys are encrypted and stored encrypted in the database.

In a further embodiment, a request is received to copy a source volume in a source storage media to a target volume in a target storage pool. The source volume data is copied to the target volume, wherein the target volume including the source volume data has a same encryption status as the target storage pool.

In a further embodiment, the data in the source volume is decrypted in response to determining that the source volume is encrypted. A determination is made as to whether encryption is enabled for the target storage pool. An encryption key for the target volume is used to encrypt the decrypted data from the source volume in response to determining that encryption is enabled for the target storage pool. The encrypted data is stored in the target volume.

In a further embodiment, the unencrypted data from the source volume is stored in the target volume in unencrypted form in response to determining that encryption is not enabled for the target storage pool.

In a further embodiment, the encryption key for the target volume comprises a common encryption key used to encrypt volumes included in the target storage pool.

In a further embodiment, the encryption key for the target volume is different from the encryption key used for other volumes in the target storage pool.

In a further embodiment, the copy operation is part of a move operation. The data from the source volume is deleted in response to copying the source volume data to the target volume.

In a further embodiment, a request is received to move a source volume in a source storage media to a target storage pool. A determination is made as to whether the source volume is encrypted and whether encryption is enabled for the target storage pool. The determination of whether the source volume is encrypted and whether encryption is enabled for the target storage pool is used to determine whether encryption or decryption is to be performed to move the source volume to the target storage pool, wherein the source volume data has a same encryption status as the target storage pool encryption status. The database is updated to indicate that the source volume is included in the target storage pool and not included in the source storage pool.

In a further embodiment, the storage media including volumes comprising removable storage media.

Further provided are a method and article of manufacture, where a server maintains a database defining at least one storage pool, wherein storage pools are defined to include at least one data volume, wherein each volume is included in at least one removable storage media. Indication is made in the database, for storage pools whether encryption is enabled for the storage pool. An encryption key is provided for volumes included in storage pools for which encryption is indicated as enabled. The encryption keys for volumes included in the storage pools for which encryption is enabled are stored, wherein the database associates the encryption keys with the volumes and storage pools. The database and the encryption keys are copies to at least one removable storage media. Information is generated on a transportation of the at least one removable storage media including the database and the encryption keys in a first shipment to an offsite location is generated. Information is also generated on a transportation of removable storage media including the volumes in storage pools defined in the database and encrypted with encryption keys indicated in the database in at least one additional shipment to the offsite location. The first shipment is separate from the at least one additional shipment.

In a further embodiment, the encryption keys are stored in the database and the database is encrypted in the removable storage media.

In a further embodiment, selection is received of at least one storage pool to transport to the offsite location. The database is queried to access information on the selected at least one storage pool, including the volumes included in the selected at least one storage pool and access the encryption keys for the volumes in the selected at least one storage pool. The accessed information and accessed encryption keys are stored in at least one removable storage media and transported in the first shipment. The removable storage media including volumes in the selected at least one storage pool are located to include in the second shipment.

DETAILED DESCRIPTION

Figure 1:
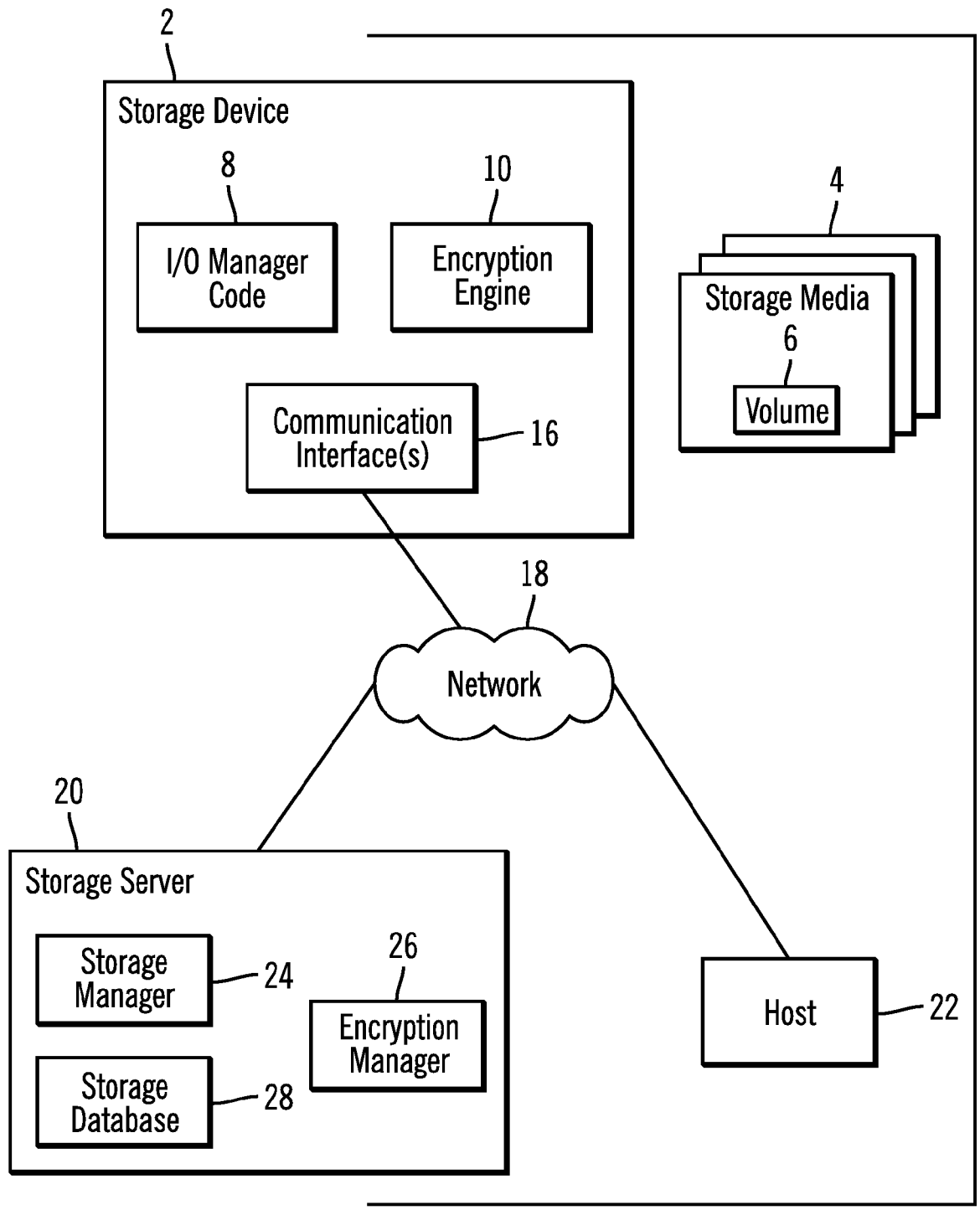
FIG. 1 illustrates an embodiment of a storage environment.

FIG. 1 illustrates an embodiment of a storage environment including a storage drive 2 including hardware and components to interface with a removable storage media 4 including one or more volumes 6, which may comprise any logical or physical definition of data. Each storage media 4 may comprise a physical storage device in which one or more volumes 6 are configured. Alternatively, a volume may be configured in the storage media of multiple storage media 4 units. The storage drive 2 includes Input/Output (I/O) manager code 8 to perform read/write operations with respect to the coupled storage media 4 and on encryption engine 10. The storage media 4 may include any type of media on which data may be stored and which may serve as removable media, including but not limited to magnetic media (such as magnetic tape or disks), optical media (such as optical tape or disks), electronic media (such as PROM, EEPROM, flash PROM, MRAM, CompactFlash™, Smartmedia™, Memory Stick ™, etc.), or other suitable media. In certain embodiments, the storage media has a cartridge housing, such as the case with a magnetic tape cartridge or removable disk drive.

In certain embodiments the storage media may comprise a "removable" storage media that is intended to be readily removed and transported to another location, such as the case with tape cartridges. Flash Memory devices, "hot swappable" hard disk drives, etc. The storage media may also comprise a storage device not intended to be readily removed, such as a hard disk drive in a drive interface that is fixed to the structure using screws, bolts, etc.

The encryption engine 10 may use one or more encryption algorithms to encrypt and decrypt data with respect to the coupled storage media 4, which include, but are not limited to, DES (Data Encryption Standard), AES (Advanced Encryption Standard), RSA (Rivest Sharmir Adleman), and other suitable encryption algorithms known in the art.

The storage drive 2 includes one or more communication interfaces 16 to enable communication with different external devices, such as computer systems, a storage library, storage server, etc. The communication interface(s) 16 may be used to provide commands and/or data to the storage drive 2.

In the embodiment of FIG. 1, communication interface 16 enables communication with a network 18 through which the storage drive 2 may communicate with a storage server 20 and additional systems, such as a host system 22. The host system may include a computer user interface to enable communication of data and commands to the storage drive 2. The host system 22 may further include a backup program, archival software of any other host application that is capable of providing data sets to backup to the storage server 20, which may manage backup and archival operations. The storage server 20 and hosts 22 may further send read/write requests to the storage drive 2 for a coupled removable storage media. The network 18 may comprise a wireless network. Wide Area Network (WAN), Local Area Network (LAN), Storage Area Network (SAN), etc.

The storage server 20 includes a storage manager 24 comprising a program to perform storage management operations, an encryption manager 26 to perform encryption related operations, such as generating encryption keys to use for volumes 6 in one or more removable storage media 4, and a storage database 28 including information on how volumes 6 configured in removable storage media 4 may be grouped in storage pools and information on the encryption keys used to encrypt data in the volumes 6. The storage database may comprise a relational database or any other type of data structure for maintaining associations of attributes of data, such as an Extended Markup Language (XML) file, etc.

The storage drive 2 may request encryption keys for a volume 6 in a storage media 4 coupled to the storage drive from the storage server 20 or another key manager to perform encryption/decryption operations with respect to the coupled volume 6. Alternatively, an encrypted version of the encryption key for a volume or an index for the encryption key may be stored in the storage media 4 with the volume 6.

Figure 2:
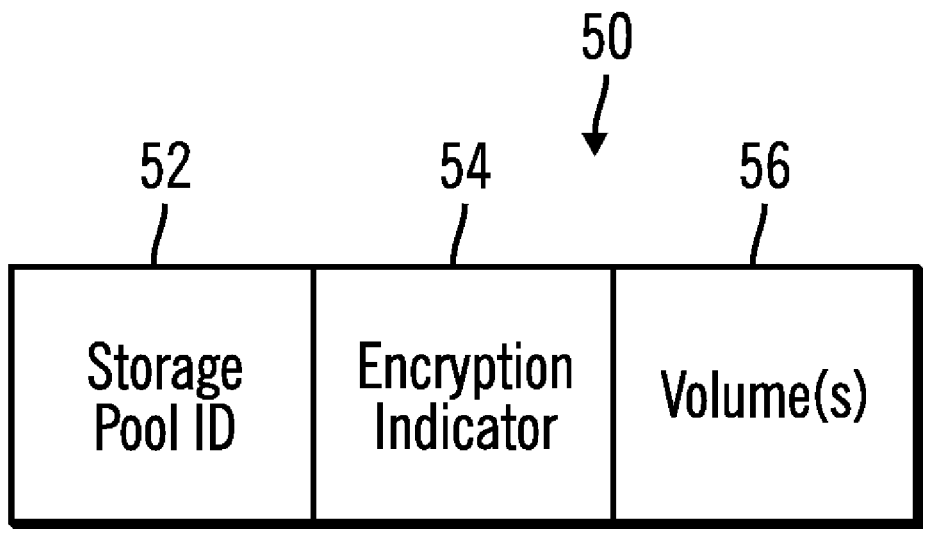
FIG. 2 illustrates an embodiment of storage pool information.

FIG. 2 illustrates an embodiment of storage pool information 50 maintained in the database 28 for one defined storage pool, including a storage pool identifier (ID) 52, an encryption indicator 54 indicating whether encryption is enabled for the storage pool identified in field 52 or whether there is no encryption, and the one or more volumes 56 that are assigned to the storage pool. Volumes 6 may be assigned to the storage pool identified in field 52 based on the class of device or storage media, in which the volume is stored. In one embodiment, a storage pool may comprise volumes 6 stored in a storage media of a homogeneous class of devices. In another embodiment, a storage pool may include volumes 6 stored in heterogeneous device classes or types of storage media, but have data of a common class or type. The encryption indicator 54 may be updated and set "on" or "off" to change the status of the storage pool as having encrypted or unencrypted status.

Figure 3:
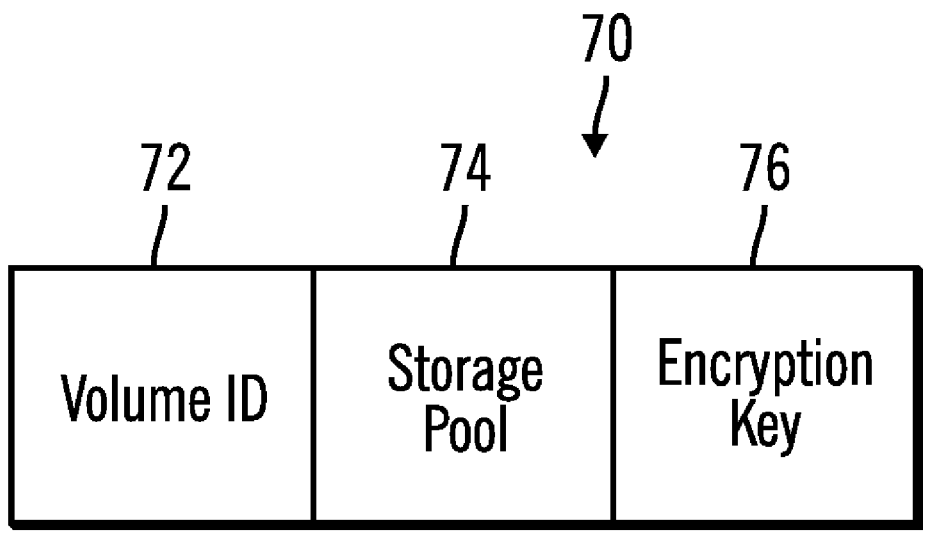
FIG. 3 illustrates an embodiment of volume information.

FIG. 3 illustrates an embodiment of volume information 70 maintained in the database 28 for volumes 6 managed by the storage server 20, including a volume identifier (ID) 72, an optional storage pool 74 in which the volume is included, if the volume is included in a storage pool, and an encryption key 76 used to encrypt and decrypt data in the volume 6 if the data is encrypted. No encryption key 76 may be provided if the data in the volume 6 identified in field 72 is unencrypted. The field 76 may include the actual encryption key or an index or identifier of an encryption key that is maintained in another location or component, such as in an external key store. In such case, the encryption manager 26 would use the key index in field 76 to access the actual encryption key from the key store (not shown). In the embodiment where the field 76 includes the actual encryption key, the encryption manager 26 may encrypt or otherwise obfuscate the encryption key using an internal encryption or scrambling algorithm to prevent unauthorized access to the encryption keys.

In certain embodiments, changing the encryption status for a storage pool, e.g., by changing the encryption indicator 54, may not change the encryption status of individual volumes already assigned to the storage pool. For instance, an unencrypted volume assigned to a storage pool whose encryption indicator 54 is changed from unencrypted to encrypted status.

However, if the data on an unencrypted volume in a storage pool is moved to a volume in a storage pool having an encrypted status, then the data from the volume may be encrypted in the transfer and stored encrypted in a volume in the target storage pool. Further, if a storage pool's status is changed from encrypted to unencrypted, then encrypted volumes in the storage pool may remain encrypted. However, if data from an encrypted volume is transferred to another storage pool or the volume is deleted from the storage pool, then at this point the encrypted volume's status may change if the data in the volume is being transferred to a storage pool having unencrypted status. In an alternative embodiment, changing a storage pool's encryption status may involve changing the status of the volumes assigned to the storage pool to comply with the changed storage pool encryption status, which may involve encrypting or decrypting the volumes already assigned to the storage pool and storing the changed data in the same or different volumes. In a yet further embodiment, the encryption status for a storage pool may be immutable, to guarantee that the encryption status of all volumes in the storage pool match the storage pool's encryption status.

If an encrypted volume is accessed during normal read/write operations, then the encryption key 76 provided for that volume, identified in field 72, is accessed and used to encrypt and decrypt data being written and read, respectively.

Figure 4:
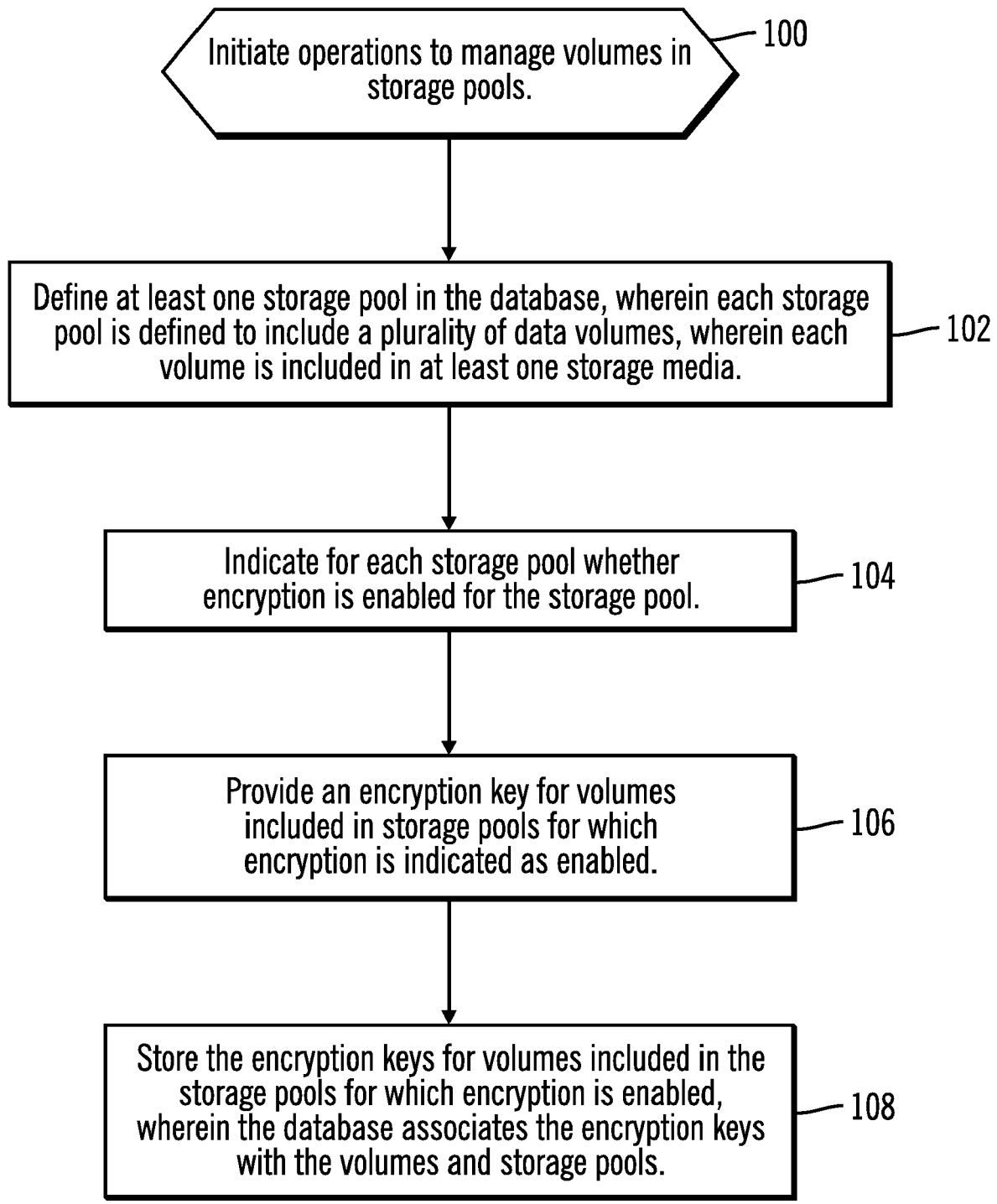
FIG. 4 illustrates an embodiment of operations to maintain storage pool, volume, and encryption key information in a storage database.

FIG. 4 illustrates an embodiment of operations initiated (at block 100) by the storage manager 24 and/or encryption manager 26 to manage volumes in defined storage pools. The storage manager 24 defines (at block 102) at least one storage pool with storage pool information 50 (FIG. 2) in the database 28, wherein each storage pool is defined to include one or more data volumes identified in field 56. Each volume is included in at least one storage media 4. The storage manager 24 also indicates (at block 104), for each storage pool, whether encryption is enabled for the storage pool in the encryption indicator 54 of the storage pool information 50. The storage manager 24 (or the encryption manager 26) provides (at block 106) in the database 28 an encryption key 76 for volumes 6 in storage pools for which encryption is indicated in field 54 as enabled. Volumes not included in storage pools may have an encryption key or remain unencrypted. The storage manager 24 (or the encryption manager 26) further stores (at block 108) the encryption keys 76 for the volumes for which encryption is enabled. In this way, the database 28 associates the encryption keys with the volumes and the volumes with storage pools, and may indirectly associate encryption keys and storage pools. A user or program may query the storage database 28 to determine encryption keys for storage pools and volumes, and other information related to the association of storage pools, encryption keys and volumes.

Figure 5:
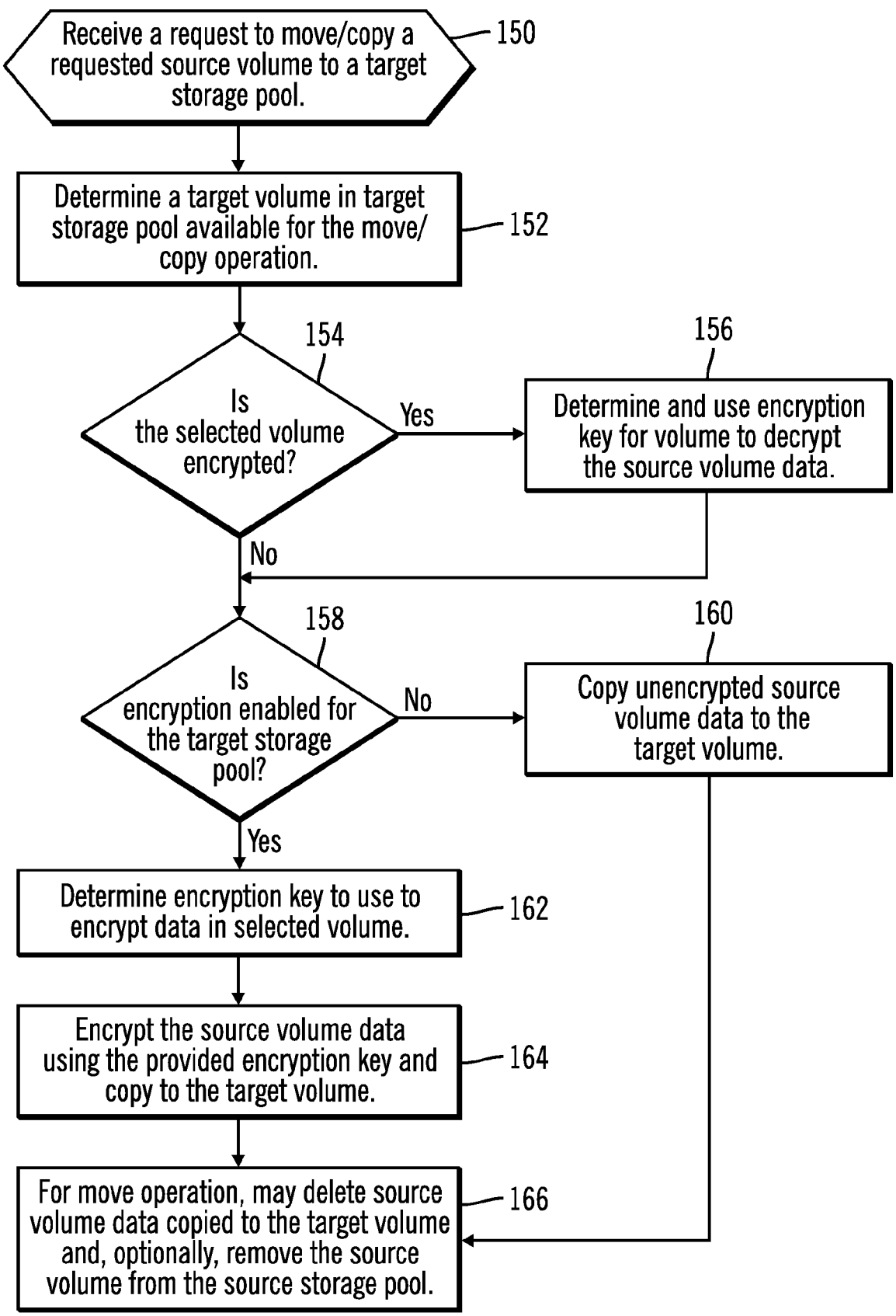
FIG. 5 illustrates an embodiment of operations to manage encryption with respect to volumes in storage pools.

FIG. 5 illustrates an embodiment of operations performed by the storage manager 24 and/or encryption manager 26 to move/copy data stored on a source volume 6 to a target storage pool 50. The operation of FIG. 5 may be performed when the source volume is not presently included in a storage pool or when the source volume is included in a source storage pool. In response to receiving (at block 150) the move/copy request, the storage manager 24 determines (at block 152) a target volume in the target storage pool that is available to receive the data in the source volume. The storage manager 24 may determine from the storage pool information 50 for the target storage pool an available volume from the indicated volumes 56 to use as the target volume or add the target volume to use to the target storage pool.

If (at block 154) the storage manager 24 determines that the source volume is encrypted, which may be determined by checking whether there is an encryption key 76 in the volume information 70 for the source volume, then the storage manager 24 may determine and use (at block 156) the encryption key 76 for the source volume to decrypt the source volume data. The storage manager 24 may cause decryption by sending the encryption key 76 to the storage drive 2, so that the storage drive encryption engine 10 (FIG. 1) performs the encryption and decryption operations with respect to the volume data. Alternatively, the encryption manager 26 may encrypt and decrypt the data using the encryption key 76, so that the storage server 20 reads and writes encrypted data via the storage drive 2.

If (at block 158) encryption is not enabled for the target storage pool, then the unencrypted source volume data is copies (at block 160) to the target volume, where it is stored unencrypted to have the same encryption status as the target storage pool. Otherwise, if (at block 158) encryption is enabled for the target storage pool, then the storage manager 24 determines (at block 162) an encryption key to use to encrypt the data in target volume, which may comprise the encryption key 76 identified in the volume information 70 for the target volume or a common encryption key for the target storage pool. As discussed, different volumes 56 in a storage pool may be encrypted using different encryption keys or there may be a common encryption key for a storage pool so that all volumes assigned to that storage pool are encrypted using the common storage pool key. The source volume data is then encrypted (at block 164) using the determined encryption key and copied to the target volume. If the operation is a move operation, then (from block 160 and 164) the storage manager 24 may delete (at block 166) the source volume data copied to the target volume, and optionally, remove the source volume from the source storage pool. If the operation is a copy operation, then the source volume data may remain undisturbed in the source storage pool.

In the described operations of FIG. 5, the source volume data is copied to a different target volume as part of the move/copy operation. In an alternative embodiment, when moving the source volume to the target storage pool, no data may be copied and the only change may be to associate the source volume with the target storage pool by updating the storage pool information 50 (FIG. 2) for the target storage pool to identify the source volume in the volumes 56 of the target storage pool and update the source volume information 70 (FIG. 3) to indicate the target storage pool in field 74. If the target storage pool has a different encryption status than the source volume, then the source volume data may be decrypted or encrypted when moving the source volume to the target storage pool so that the source volume has the same encryption status as the target storage pool.

With the described operations of FIGS. 4 and 5, encryption is managed with respect to the storage pools so that the attributes of a storage pool may determine how data in volumes assigned to the storage pool is encrypted.

Figure 6:
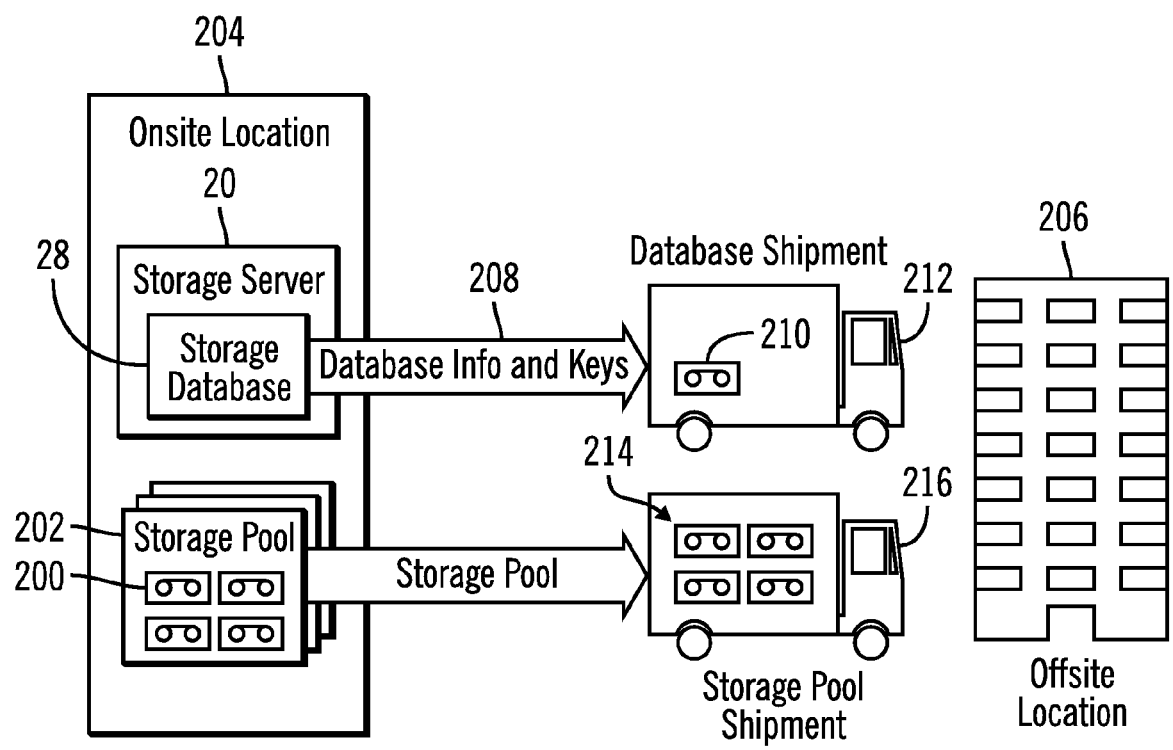
FIG. 6 illustrates and environment for offsite data management.

FIG. 6 illustrates an operational environment in which the storage server 20 may be used to manage the transportation of volumes 6 for removable storage media 200 in storage pools 202 from an on-site location 204 including the storage server 20 and storage drive 2 to an offsite location 206, which may be a considerable distance from the onsite location 204 to protect data against unexpected disasters. The storage server 20 may transfer the encryption keys and storage pool information 204 from the database 28 for the volumes 6 to transfer to one or more removable storage media 210 to include in a shipment 212 to the offsite location 206. The storage server 20 may further provide information on removable storage media 214 including the volumes in the storage pools to transport so that the storage media 214 may be included in one or more separate shipments 216 to the offsite location 206.

Figure 7:
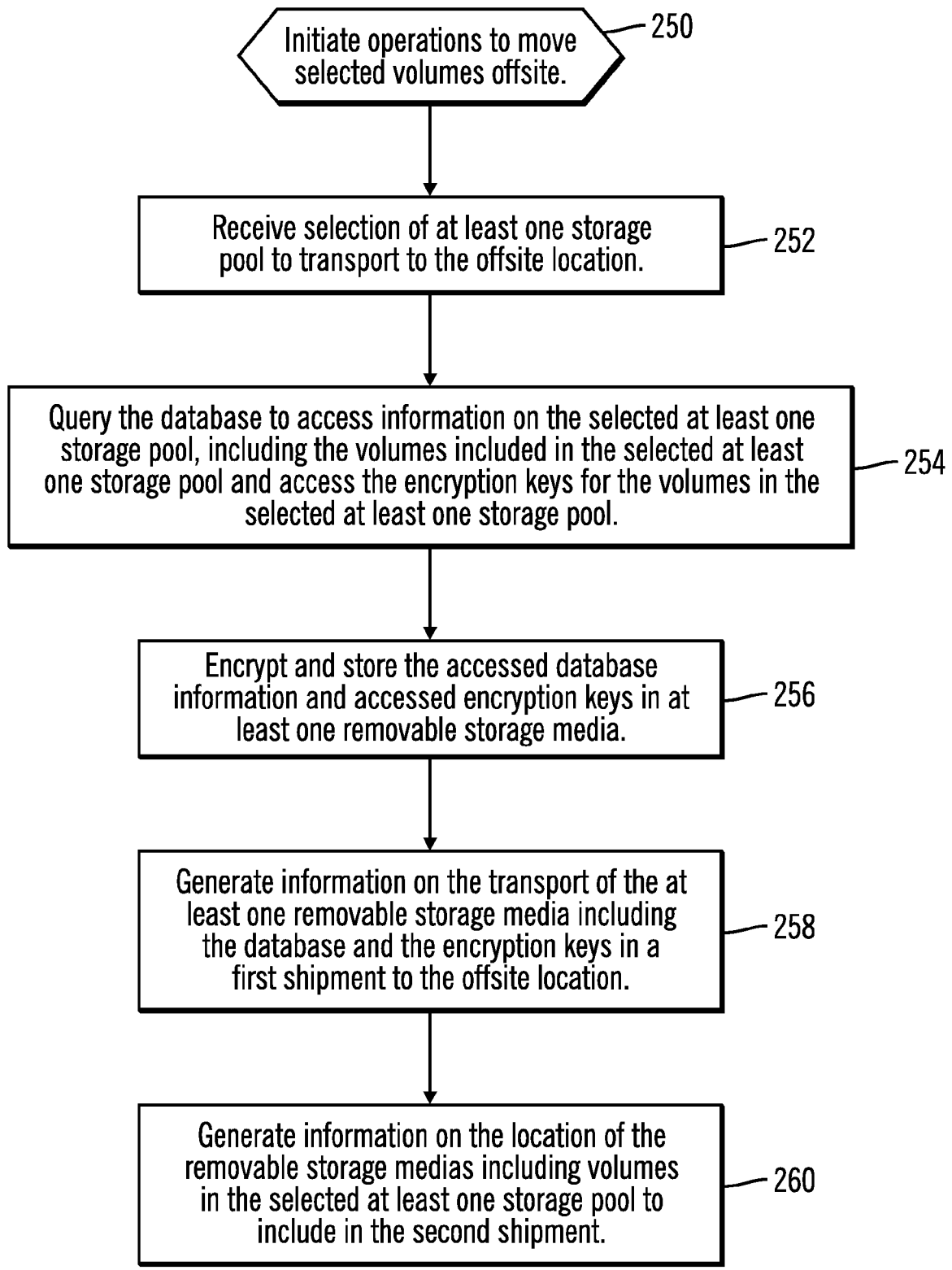
FIG. 7 illustrates and embodiment of operations to provide offsite protection of volumes in storage pools.

FIG. 7 illustrates an embodiment of operations performed by the storage server 20 to manage the transportation of one or more removable storage media 210 from an onsite location 204 to an offsite location 206 for backup and disaster protection. Upon initiating (at block 250) an operation to transport volumes in storage pools, the storage manager 24 receives (at block 252) selection of a volume or storage pool of volumes to transport to the offsite location. The storage manager 24 queries (at block 254) the storage database 28 to access information 50 (FIG. 2) on the selected at least one storage pool, including the volumes 56 included in the selected at least one storage pool, and accesses from the volume information 70 (FIG. 3) the encryption keys 76 for the volumes in the selected at least one storage pool. The storage manager 24 then encrypts and stores (at block 256) the accessed database information and accessed encryption keys 208 in at least one removable storage media 210.

The storage manager 24 may further generate (at block 258) information on the transport of at least one removable storage media 210 including the database and the encryption keys 204 in the first shipment 212 to the offsite location 206. The storage manager 24 may also generate (at block 260) information on the location of the removable storage media 214 including volumes in the selected at least one storage pool to include in the second shipment 216. This generated information may be used by the backup administrator to schedule the shipments and deliveries. Alternatively, the storage manager 24 may automatically schedule the shipments and deliveries to ensure that the encryption keys and database information 208 and the removable storage media 214 including the data volumes are sent in separate shipments 212, 216. In this way, if removable storage media in one shipment are lost or stolen, then unauthorized persons cannot access the data volumes because either they will not have the data volumes or the encryption keys needed to decrypt the data volumes.

The storage manager 24 may perform the operations of FIGS. 5, 6, and 6 in response to user requests via a user interface, e.g., command line or graphical user interface, originating from the storage server 20 or a host 22. Alternatively, the operations may be performed in response to applications executing in the storage server 20 or hosts 22.

The described embodiments provide techniques to manage encryption at a storage pool level for storage media managed as part of storage pools to provide consistent encryption handling of one or more storage media in one storage pool.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs), DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In certain embodiments, certain operations are described as being performed by the storage manager 24 and encryption manager 26. Operations described as being performed by the storage manager 24 may be performed by the encryption manager 26, and vice versa. Further the storage manager 24 and encryption manager 26 may be part of the same program component or separate components. Yet further, the storage manager 24 may call the encryption manager 26 to have the encryption manager 26 perform encryption related operations or the storage manager 24 may perform the encryption related operations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2 and 3 show examples of how storage pool and volume encryption may be maintained. In alternative embodiments, this information may be arranged in different ways, duplicated or consolidated. Further, in certain embodiments the volume and storage pool information may include additional or different information than described.

The illustrated operations of FIGS. 4, 5, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   defining at least one storage pool in a database, wherein the at least one storage pool is defined to include a plurality of data volumes, wherein each volume is included in at least one storage media;
   indicating for the at least one storage pool an encryption status indicating whether encryption is enabled for the storage pools;
   providing an encryption key for volumes included in storage pools for which encryption is indicated as enabled;
   storing the encryption keys for volumes included in the storage pools for which encryption is enabled, wherein the database associates the encryption keys with the volumes and the volumes with the storage pools;
   receiving source volumes having data to add to a target storage pool comprising one of the at least one storage pool;
   determining the encryption status for the target storage pool in response to receiving each of the source volumes;
   storing the data of the source volumes as encrypted in response to determining that the encryption status indicates that encryption is enabled for the target storage pool; and
   storing the data of the source volumes as unencrypted in response to determining that the encryption status indicates that encryption is not enabled for the target storage pool.

2. The method of claim 1, wherein the encryption keys are encrypted and stored encrypted in the database.

3. The method of claim 1, wherein receiving the source volumes to add to the target storage pool comprises receiving a request to copy one of the source volumes in a source storage media to a target volume in the target storage pool, further comprising:
   copying the source volume data in the request to the target volume, wherein the target volume including the source volume data has a same encryption status as the target storage pool.

4. The method of claim 3, further comprising:
   decrypting the data in the source volume in the request in response to determining that the source volume is encrypted;
   using an encryption key for the target volume to encrypt the decrypted data from the source volume in response to determining that encryption is enabled for the target storage pool; and
   wherein storing the source volume data as encrypted comprises storing the encrypted source volume data in the target volume.

5. The method of claim 4, wherein storing the source volume data in the request as unencrypted comprises storing the unencrypted data from the source volume in the target volume in unencrypted form in response to determining that encryption is not enabled for the target storage pool.

6. The method of claim 4, wherein the encryption key for the target volume comprises a common encryption key used to encrypt volumes included in the target storage pool.

7. The method of claim 4, wherein the encryption key for the target volume is different from the encryption key used for other volumes in the target storage pool.

8. The method of claim 3, wherein the copy operation is part of a move operation, further comprising:
   deleting the data from the source volume in the request in response to copying the source volume data to the target volume.

9. The method of claim 1, wherein receiving the source volumes to add to the target storage pool comprises receiving a request to move one of the source volumes in a source storage media to the target storage pool, further comprising:
   determining whether the source volume in the request is encrypted;
   determining whether encryption is enabled for the target storage pool; and
   using the determination of whether the source volume in the request is encrypted and whether encryption is enabled for the target storage pool to determine whether encryption or decryption is to be performed to move the source volume to the target storage pool, wherein the source volume data has a same encryption status as the target storage pool encryption status.

10. The method of claim 1, wherein the storage media comprises removable storage media.

11. A method, comprising:
maintaining, by a server, a database defining at least one storage pool, wherein storage pools are defined to include at least one data volume, wherein each volume is included in at least one removable storage media;
indicating in the database, for storage pools whether encryption is enabled for the storage pool;
providing an encryption key for volumes included in storage pools for which encryption is indicated as enabled;
storing the encryption keys for volumes included in the storage pools for which encryption is enabled, wherein the database associates the encryption keys with the volumes and storage pools;
copying the database and the encryption keys in at least one removable storage media;
generating information on a transportation of the at least one removable storage media including the database and the encryption keys in a first shipment to an offsite location; and
generating information on a transportation of removable storage media including the volumes in storage pools defined in the database and encrypted with encryption keys indicated in the database in at least one additional shipment to the offsite location, wherein the first shipment is separate from the at least one additional shipment.

12. The method of claim 11, wherein the encryption keys are stored in the database and wherein the database is encrypted in the removable storage media.

13. The method of claim 11, further comprising:
receiving selection of at least one storage pool to transport to the offsite location;
querying the database to access information on the selected at least one storage pool, including the volumes included in the selected at least one storage pool and access the encryption keys for the volumes in the selected at least one storage pool, wherein the accessed information and accessed encryption keys are stored in at least one removable storage media and transported in the first shipment; and
locating the removable storage media including volumes in the selected at least one storage pool to include in the second shipment.

14. A system enabled to interface with a plurality of storage media, comprising:
a database defining at least one storage pool, wherein the at least one storage pool is defined to include a plurality of data volumes, wherein each volume is included in at least one of the storage media;
a storage manager enabled to cause operations to be performed, the operations comprising:
indicating for the at least one storage an encryption status in the database indicating whether encryption is enabled for the storage pools; and
an encryption manager enabled to cause operations to be performed, the operations comprising:
providing an encryption key for volumes included in storage pools for which encryption is indicated as enabled;
storing the encryption keys for volumes included in the storage pools for which encryption is enabled, wherein the database associates the encryption keys with the volumes and the volumes with the storage pools;
receiving source volumes having data to add to a target storage pool comprising one of the at least one storage pool;
determining the encryption status for the target storage pool in response to receiving each of the source volumes;
storing the data of the source volumes as encrypted in response to determining that the encryption status indicates that encryption is enabled for the target storage pool; and
storing the data of the source volumes as unencrypted in response to determining that the encryption status indicates that encryption is not enabled for the target storage pool.

15. The system of claim 14, wherein the encryption manager further encrypts the encryption keys and stores the encrypted encryption keys in the database.

16. The system of claim 14, wherein the storage manager is further enabled to cause operations comprising:
wherein receiving the source volumes to add to the target storage pool comprises receiving a request to copy one of the source volumes in a source storage media to a target volume in the target storage pool; and
copying the source volume data in the request to the target volume, wherein the target volume including the source volume data has a same encryption status as the target storage pool.

17. The system of claim 16, wherein the encryption manager is further enabled to perform:
decrypting the data in the source volume in the request in response to determining that the source volume is encrypted;
using an encryption key for the target volume to encrypt the decrypted data from the source volume in response to determining that encryption is enabled for the target storage pool; and
wherein storing the source volume data as encrypted comprises storing the encrypted source volume data in the target volume.

18. The system of claim 17, wherein storing the source volume data in the request as unencrypted comprises
storing the unencrypted data from the source volume in the target volume in unencrypted form in response to determining that encryption is not enabled for the target storage pool.

19. The system of claim 17, wherein the encryption key for the target volume comprises a common encryption key used to encrypt volumes included in the target storage pool.

20. The system of claim 17, wherein the encryption key for the target volume is different from the encryption key used for other volumes in the target storage pool.

21. The system of claim 16, wherein the copy operation is part of a move operation, wherein the storage manager is further enabled to perform:
deleting the data from the source volume in the request in response to copying the source volume data to the target volume.

22. The system of claim 14, wherein the storage manager is further enabled to perform:
wherein receiving the source volumes to add to the target storage pool comprises receiving a request to move one of the source volumes in a source storage media to the target storage pool;
determining whether the source volume in the request is encrypted;
determining whether encryption is enabled for the target storage pool; and
using the determination of whether the source volume in the request is encrypted and whether encryption is enabled for the target storage pool to determine whether encryption or decryption is to be performed to move the source volume to the target storage pool, wherein the source volume data has a same encryption status as the target storage pool encryption status.

23. The system of claim 14, wherein the storage media comprises removable storage media.

24. An article of manufacture including code enabled to cause operations to be performed with respect to a plurality of storage media and a database, the operations comprising:
   defining at least one storage pool in the database, wherein the at least one storage pool is defined to include a plurality of data volumes, wherein each volume is included in at least one of the storage media;
   indicating for the at least one storage pool an encryption status indicating whether encryption is enabled for the storage pools;
   providing an encryption key for volumes included in storage pools for which encryption is indicated as enabled; and
   storing the encryption keys for volumes included in the storage pools for which encryption is enabled, wherein the database associates the encryption keys with the volumes and the volumes with the storage pools;
   receiving source volumes having data to add to a target storage pool comprising one of the at least one storage pool;
   determining the encryption status for the target storage pool in response to receiving each of the source volumes;
   storing the data of the source volumes as encrypted in response to determining that the encryption status indicates that encryption is enabled for the target storage pool; and
   storing the data of the source volumes as unencrypted in response to determining that the encryption status indicates that encryption is not enabled for the target storage pool.

25. The article of manufacture of claim 24, wherein the encryption keys are encrypted and stored encrypted in the database.

26. The article of manufacture of claim 24, wherein receiving the source volumes to add to the target storage pool comprises receiving a request to copy one of the source volumes in a source storage media to a target volume in the target storage pool further comprising:
   copying the source volume data in the request to the target volume, wherein the target volume including the source volume data has a same encryption status as the target storage pool.

27. The article of manufacture of claim 26, wherein the operations further comprise:
   decrypting the data in the source volume in the request in response to determining that the source volume is encrypted;
   using an encryption key for the target volume to encrypt the decrypted data from the source volume in response to determining that encryption is enabled for the target storage pool; and
   wherein storing the source volume data as encrypted comprises storing the encrypted source volume-data in the target volume.

28. The article of manufacture of claim 27, wherein storing the source volume data in the request as unencrypted comprises storing the unencrypted data from the source volume in the target volume in unencrypted form in response to determining that encryption is not enabled for the target storage pool.

29. The article of manufacture of claim 27, wherein the encryption key for the target volume comprises a common encryption key used to encrypt volumes included in the target storage pool.

30. The article of manufacture of claim 27, wherein the encryption key for the target volume is different from the encryption key used for other volumes in the target storage pool.

31. The article of manufacture of claim 26, wherein the copy operation is part of a move operation, wherein the operations further comprise:
   deleting the data from the source volume in the request in response to copying the source volume data to the target volume.

32. The article of manufacture of claim 24, wherein receiving the source volumes to add to the target storage pool comprises receiving a request to move one of the source volumes in a source storage media to a target storage pool, further comprising
   determining whether the source volume in the request is encrypted;
   determining whether encryption is enabled for the target storage pool; and
   using the determination of whether the source volume in the request is encrypted and whether encryption is enabled for the target storage pool to determine whether encryption or decryption is to be performed to move the source volume to the target storage pool, wherein the source volume data has a same encryption status as the target storage pool encryption status.

33. The article of manufacture of claim 24, wherein the storage media comprises removable storage media.

34. An article of manufacture including code enabled to cause operations to be performed with respect to a plurality of storage media and a database, the operations comprising:
   defining in the database at least one storage pool, wherein storage pools are defined to include at least one data volume, wherein each volume is included in at least one removable storage media;
   indicating in the database, for storage pools whether encryption is enabled for the storage pools;
   providing an encryption key for volumes included in storage pools for which encryption is indicated as enabled;
   storing the encryption keys for volumes included in the storage pools for which encryption is enabled, wherein the database associates the encryption keys with the volumes and storage pools;
   copying the database and the encryption keys in at least one removable storage media;
   generating information on a transportation of the at least one removable storage media including the database and the encryption keys in a first shipment to an offsite location; and
   generating information on a transportation of removable storage media including the volumes in storage pools defined in the database and encrypted with encryption keys indicated in the database in at least one additional shipment to the offsite location, wherein the first shipment is separate from the at least one additional shipment.

35. The article of manufacture of claim 34, wherein the encryption keys are stored in the database and wherein the database is encrypted in the removable storage media.

36. The article of manufacture of claim 34, wherein the operations further comprise:
  receiving selection of at least one storage pool to transport to the offsite location;
  querying the database to access information on the selected at least one storage pool, including the volumes included in the selected at least one storage pool and access the encryption keys for the volumes in the selected at least one storage pool, wherein the accessed information and accessed encryption keys are stored in at least one removable storage media and transported in the first shipment; and
  locating the removable storage media including volumes in the selected at least one storage pool to include in the second shipment.

* * * * *